United States Patent
He et al.

(10) Patent No.: US 7,440,156 B1
(45) Date of Patent: Oct. 21, 2008

(54) INTEGRATED FIBER OPTICAL ATTENUATOR WITH MONOTONIC ATTENUATION

(75) Inventors: Chun He, Frement, CA (US); Frank Xi Wu, Fremont, CA (US); River Yang, Guang Dong (CN)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 122 days.

(21) Appl. No.: 11/294,896

(22) Filed: Dec. 5, 2005

(51) Int. Cl.
*G02B 26/02* (2006.01)

(52) U.S. Cl. .................................. 359/227

(58) Field of Classification Search .......... 359/227, 359/233, 234, 236, 237; 385/140
See application file for complete search history.

(56) References Cited

U.S. PATENT DOCUMENTS 6,144,794 A * 11/2000 Mao et al. .................. 385/140
6,553,175 B2 * 4/2003 Jaspan ........................ 385/140

* cited by examiner

*Primary Examiner*—Euncha P Cherry
(74) *Attorney, Agent, or Firm*—Joe Zheng

(57) ABSTRACT

Designs of optical devices for attenuating a light signal are disclosed. According to embodiment, an attenuator includes a screw and a light blocker, wherein the light blocker has only translational movements when the screw is screwed in or out. To facilitate the light signal in and out, a first collimator to receive a light beam, and a second collimator to output the light beam, wherein the light beam is attenuated by the light blocker when the light is transmitted from the first collimator to the second collimator.

12 Claims, 3 Drawing Sheets

INTEGRATED FIBER OPTICAL ATTENUATOR WITH MONOTONIC ATTENUATION

BACKGROUND OF THE INVENTION

1. Field of the Invention

The invention is generally related to the area of optical communications. In particular, the invention is related to a method and apparatus for regulating optical channel signals with specified wavelengths.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

In general, each of the channel signals comes from a different source and may have transmitted over different mediums, resulting in a different power level. Without equalizing the power levels of the channel signals that are to be combined or multiplexed, some channels in a multiplexed signal may be distorted as a result of various stages of processing the multiplexed signal. On the other hand, many optical devices or systems would not function optimally when incoming signals are beyond a predetermined signal level range. In fact, the power of the incoming signals shall not be too low, neither too high. To ensure that all optical devices or systems receive proper levels of optical signals, attenuation devices are frequently used to adjust the optical signals before they reach an optical device.

Many existing optical attenuation devices lack accuracy and have high feedback noise. For example, screws are often used to intrude in an optical path to disrupt or cause to reflect some of the energy in a light beam not to reach a destination so that the light beam may be attenuated. However, in practical application, it is noticed that such attenuation is hard to be controlled. Because every time, a screw is rotated either upwards or downwards, the attenuation is not monotonically changed. This is particularly related to the surface changes of the screw. Unless the tip of a screw is made perfect, the circumambiency of the tip of the screw often has some variances, which resulting in non-monotonic changes in attenuation when the screw is caused to move up and down. Although a perfect screw may be made, the eventual cost of the attenuator may not be practical. Therefore there is a need for cost-effective attenuators with monotonic attenuation.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices and methods for attenuating a light signal. According to one aspect of the present invention, an attenuator includes a screw and a light blocker, wherein the light blocker has only translational movements when the screw is screwed in or out. To facilitate the light signal in and out, a first collimator to receive a light beam, and a second collimator to output the light beam, wherein the light beam is attenuated by the light blocker when the light is transmitted from the first collimator to the second collimator.

According to another aspect of the present invention, the light blocker has a tip that is so shaped that a portion of the light beam, when hit by the tip, will reflect to a direction other than either one of the collimators.

There are numerous benefits, features, and advantages in the present invention. One of them is the monotonic change in attenuation when adjusting the attenuation. Another one of the benefits, features, and advantages in the present invention is that attenuators made in accordance with the present invention possess the characteristics of simple structure, good performance, high reliability and low cost.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
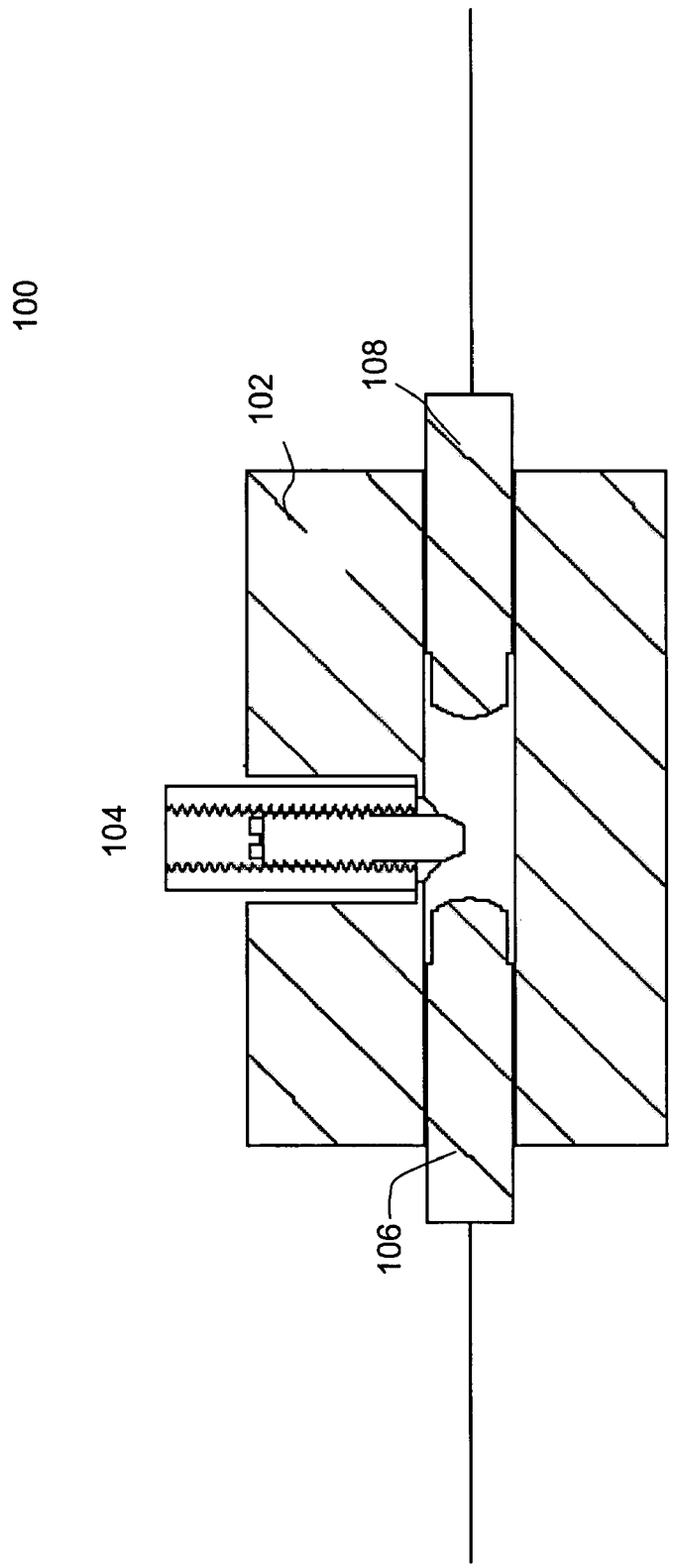
FIG. 1 shows an optical device, also referred to as attenuator, for attenuating channel signals, according to one embodiment of the invention.
Figure 2:
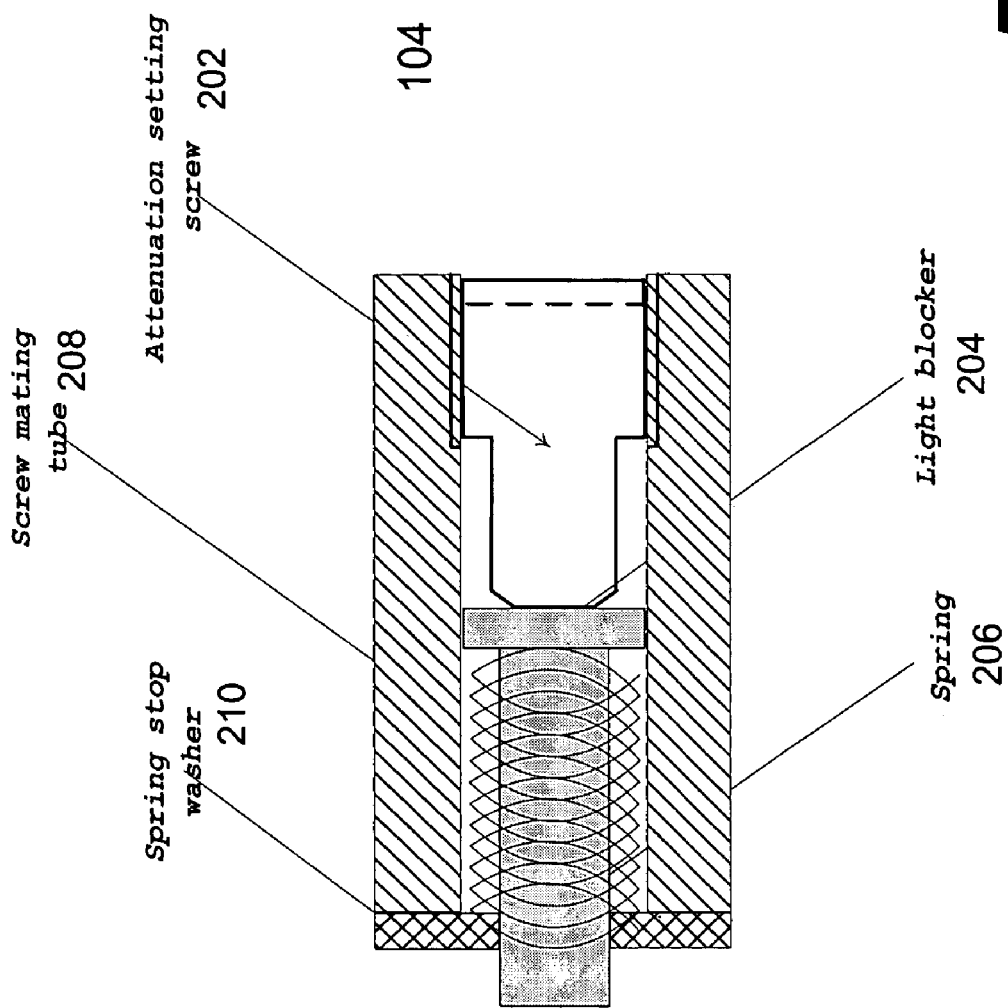
FIG. 2 shows a diagram of an attenuating means used in FIG. 1, according to one embodiment of the present invention.
Figure 3:
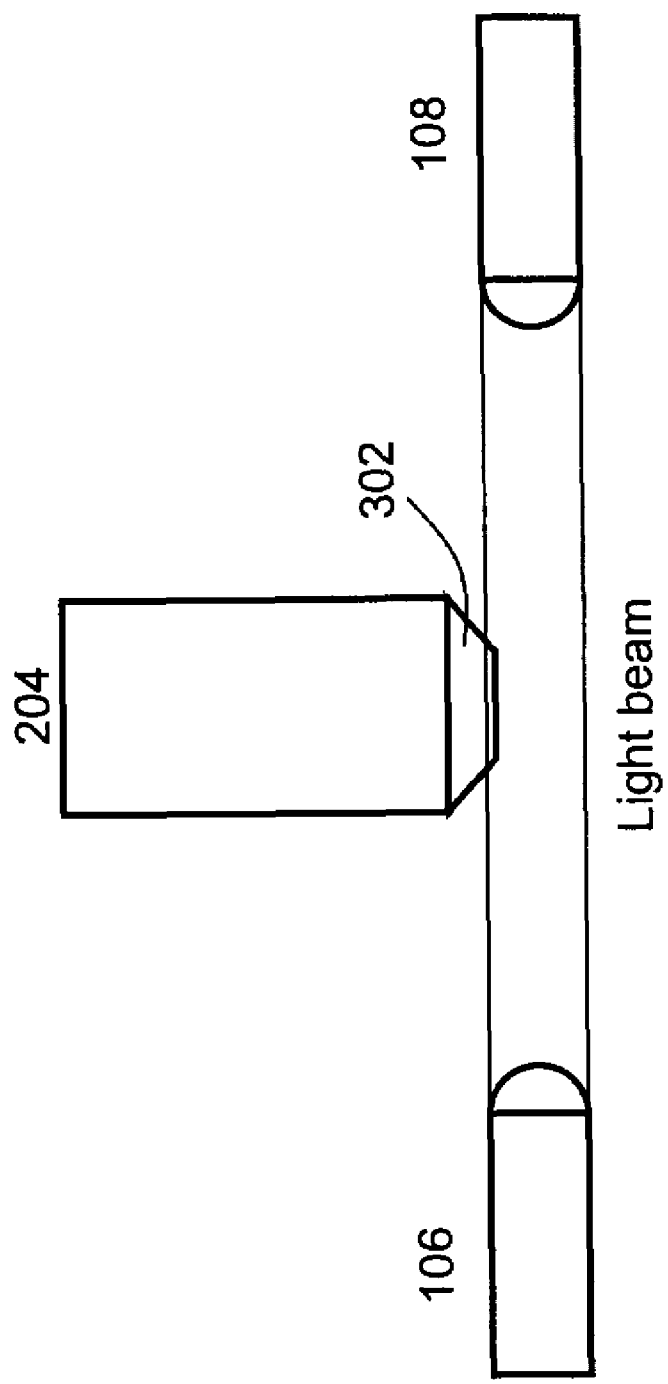
FIG. 3 shows is an illustration of how the attenuating means attenuates light signals between two collimators.

Embodiments of the present invention are discussed herein with reference to FIGS. 1-3. However, those skilled in the art will readily appreciate that the detailed description given herein with respect to these figures is for explanatory purposes as the invention extends beyond these limited embodiments.

FIG. 1 shows an optical device, also referred to as attenuator 100, for attenuating channel signals according to one embodiment of the invention. The optical device 100 is utilized to attenuate the signal strengths of channel signals received at one end and output attenuated channel signals at another end. In particular, FIG. 1 shows the attenuator 100 is an integrated device. The attenuator 100 is housed in a solid housing 102. The material of the block is preferably solid, such as stainless steel, aluminum, copper or other metal or material that has reasonably good thermal characteristics and mechanical strengths to support the components used to achieve the attenuation. In addition, it is preferable that the material can withstand the fiber straight pulling, side pulling, vibration, and mechanical shocks, and has good bounding characteristics to epoxies.

As shown in FIG. 1, the components in the housing 102 include a means 104 for attenuating signals, and two collimators 106 and 108, both are respectively positioned on both ends of the housing 102. In addition, external hardware is provided to couple two respective fibers with the two collimators 106 and 108. As a result, a light beam coming from a fiber is projected onto the collimator 106, attenuated by the attenuating means 104, if necessary, and is then collected by the collimator 108 for output through another fiber. According to one embodiment, the collimators 106 and 108 are respectively fixed to the housing 102 by thermal epoxy, in situ, after a proper alignment of the collimators 106 and 108 to achieve a minimum loss.

FIG. 2 shows a diagram of the attenuating means 104 according to one embodiment of the present invention. As illustrated, the attenuating means 104 includes an attenuation setting screw 202, a light blocker 204 and a spring 206, all encapsulated in a screw mating tube 208 and a spring stop washer 210. Instead of having a screw directly attenuate a light beam, the light blocker 204 is used to attenuate a light beam. The light blocker 204 is pushed downwards by the screw 202 when the screw 202 is screwed in and upwards by the spring 206 when the screw 202 is screwed out. One of the advantages, benefits and features of the embodiment shown in FIG. 2 is that the light blocker 204 is always moved along a line or translationally.

The purely translational moving of the light blocker 204 is achieved by turning in the attenuation setting screw 202. While the locked position of the light blocker is attained by the spring 206 that is placed between the light blocker 204 and a spring stop that is attached to the screw mating tube. The spring stop can be made as part of the mating tube, or can be made separately and attached to the mating tube 208 afterward, as shown in FIG. 2.

FIG. 3 shows is an illustration of how the attenuating means 104 attenuates light signals between two collimators 106 and 108. The light blocker 204 has a tip 302 that is preferably so shaped that a portion of the light signals, when hit the tip 302, will reflect to a direction other than the collimator 106. With the introduction of the tip in the optical path, the attenuation to the signal is realized.

In con junction with FIG. 2, it can be appreciated that the motion of the tip 302 is translational. Even if there is some dirt on the tip 302, because there is no rational motion thereof, the dirt just contributes to the attenuation. The amount of the attenuation is steadily controllable.

Given the description herein, those skilled in the art can appreciate that the optical attenuators made in accordance with the present invention can also resist to drastic environmental temperature variations and high humidity working condition.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What we claim:

1. An optical device comprising:
   an attenuating means including a screw and a light blocker coaxially aligned, wherein the light blocker has only translational movements when the screw is screwed in or out;
   a first collimator to receive a light beam, and
   a second collimator to output the light beam, wherein the light beam is attenuated by the light blocker of the attenuating means when a tip of the light blocker intrudes in an optical path in which the light beam is transmitted from the first collimator to the second collimator.

2. The optical device as recited in claim 1, wherein the attenuating means the first collimator, the second collimator, and the attenuating means are included in a housing made of a solid material.

3. The optical device as recited in claim 2, wherein the first and second collimators are glued into the housing.

4. The optical device as recited in claim 1, wherein the attenuating means further includes a sprint and a spring stop washer.

5. The optical device as recited in claim 4, wherein the screw, the light blocker and the spring are encapsulated in a screw mating tube and a spring stop washer.

6. The optical device as recited in claim 4, wherein, the light blocker is pushed downwards by the screw when the screw is screwed in and upwards by the spring when the screw is screwed out.

7. The optical device as recited in claim 1, wherein a tip of the light blocker to attenuate the light signal is so shaped that a portion of the light beam, when intercepted by the tip, will reflect to a direction other than either one of the first and second collimators.

8. An optical device comprising:
   a single piece of housing including:
   a first collimator positioned to receive a light beam;
   a second collimator positioned to output the light beam; and
   a screw and a light blocker coaxially aligned, wherein the light blocker has only translational movements when the screw is screwed in or out;
   wherein the light beam is attenuated by an intrusion of a tip of the light blocker into an optical path for the light beam being transmitted from the first collimator to the second collimator.

9. The optical device as recited in claim 8, wherein the tip is so shaped that a portion of the light beam, when intercepted by the tip, will reflect to a direction other than either one of the first and second collimators.

10. The optical device as recited in claim 9, further comprising a spring to support the light blocker.

11. The optical device as recited in claim 10, wherein the light blocker is pushed downwards by the screw when the screw is screwed in and upwards by the spring when the screw is screwed out.

12. The optical device as recited in claim 11, wherein the screw, the light blocker and the spring are encapsulated in a screw mating tube that is inserted into the housing.

* * * * *